US006481052B1

(12) United States Patent
Beall

(10) Patent No.: US 6,481,052 B1
(45) Date of Patent: Nov. 19, 2002

(54) DOOR HOLDING DEVICE FOR WEDGING A DOOR RELATIVE TO A CEILING

(76) Inventor: Gregory A. Beall, 806 Kellogg #5, Janesville, WI (US) 53545

( * ) Notice: Subject to any disclaimer, the term of this patent is extended or adjusted under 35 U.S.C. 154(b) by 0 days.

(21) Appl. No.: 09/655,900

(22) Filed: Sep. 6, 2000

(51) Int. Cl.[7] .......................... F04G 25/04; F16M 13/00

(52) U.S. Cl. .......................... 16/85; 16/422; 248/354.1; 248/354.6; 269/53; 269/905; 254/133 A

(58) Field of Search .......................... 248/354.1, 354.6, 248/200.1, 181, 181.1, 288.31, 156; 269/905, 904, 254 CS, 53, 54.1; 254/133 A; 16/85, 426, 422, 421

(56) References Cited

U.S. PATENT DOCUMENTS

| | | | | |
|---|---|---|---|---|
| 2,844,348 A | * 7/1958 | Jordan | ..................... | 248/354.3 |
| 3,615,114 A | * 10/1971 | Harris | ..................... | 292/288 |
| 5,090,648 A | * 2/1992 | Wood, IV | ..................... | 248/125.3 |
| 5,131,701 A | * 7/1992 | Stepniewski | ..................... | 292/339 |
| 5,164,011 A | * 11/1992 | Ray | ..................... | 118/500 |
| 5,322,403 A | * 6/1994 | Herde | ..................... | 248/354.1 |
| 5,568,954 A | * 10/1996 | Burgess | ..................... | 292/338 |
| 5,924,469 A | * 7/1999 | Whittemore | ..................... | 160/368.1 |
| 6,308,653 B1 | * 10/2001 | Geraci | ..................... | 114/361 |
| 6,321,823 B1 | * 11/2001 | Whittemore | ..................... | 160/368.1 |

* cited by examiner

*Primary Examiner*—Anthony Knight
*Assistant Examiner*—Doug Hutton
(74) *Attorney, Agent, or Firm*—David J. Archer

(57) ABSTRACT

A door holding device is disclosed for wedging a door relative to a ceiling for preventing swinging or falling over of the door during painting thereof. The device includes a tubular member having a first and a second end. A biasing device having a first and a second extremity is disposed within the tubular member so that the first extremity of the biasing device abuts against the first end of the tubular member. A piston having a first and a second termination is slidably disposed within the tubular member so that the first termination of the piston abuts against the second extremity of the biasing device such that the piston is urged by the biasing device axially away from the first end of the tubular member. A door engaging fastener is rigidly secured to the first end of the tubular member such that in use of the device, the door engaging fastener is disposed between the door and the first end of the tubular member. A ceiling pad is connected to the second termination of the piston for engaging the ceiling, the arrangement being structured such that in use of the device, when the device is positioned between the door and the ceiling, the biasing device urges the door engaging fastener against the door and the ceiling pad against the ceiling so that the door is wedged and prevented from swinging or falling over so that painting of the door is permitted.

8 Claims, 3 Drawing Sheets

DOOR HOLDING DEVICE FOR WEDGING A DOOR RELATIVE TO A CEILING

BACKGROUND OF THE INVENTION

1. Field of the Invention

The present invention relates to a door holding device for wedging a door relative to a ceiling. More specifically, the present invention relates to a door holding device for wedging a door relative to a ceiling for preventing the door from falling over for painting and drying purposes.

2. Information Disclosure Statement

In the construction industry, when a house is built, the carpenters typically hang the doors prior to having the doors painted. Consequently, a painter will often remove the door by extracting the hinge pins and will prop the door against a wall for painting. When one side of the door is painted, the door must be turned over for painting the other side. The aforementioned procedures are time consuming and the turning over of a freshly painted door often causes marking or smudging of the paintwork.

The present invention enables a painter to wedge the door open by means of a device which extends between the top of the door and the ceiling. The device may be positioned between the top of the door and the ceiling when the hinge pins have been removed. Alternatively, the door may be wedged in the open disposition thereof while hinged to the door frame.

Additionally, the device according to the present invention is particularly applicable for assisting a painter in painting both sides of a door without having to turn the door. However, the present invention is equally useful in wedging a window or other object relative to a ceiling for simplifying the painting thereof.

Therefore, it is a primary feature of the present invention to provide a door holding device that overcomes the problems associated with the prior art door painting arrangements.

Another feature of the present invention is the provision of a door holding device that is inexpensive to manufacture and easy to use.

A further feature of the present invention is the provision of a door holding device that enables a painter to easily paint both sides of a door without any need to turn the door.

Other features and advantages of the present invention will be readily apparent to those skilled in the art by a consideration of the detailed description of a preferred embodiment of the present invention contained herein.

SUMMARY OF THE INVENTION

The present invention relates to a door holding device for wedging a door relative to a ceiling for preventing the door from falling over for painting and drying purposes. The device includes a tubular member having a first and a second end. A biasing device having a first and a second extremity is disposed within the tubular member so that the first extremity of the biasing device abuts against the first end of the tubular member. A piston having a first and a second termination is slidably disposed within the tubular member so that the first termination of the piston abuts against the second extremity of the biasing device such that the piston is urged by the biasing device axially away from the first end of the tubular member. A door engaging fastener is rigidly secured to the first end of the tubular member such that in use of the device, the door engaging fastener is disposed between the door and the first end of the tubular member. A ceiling pad is connected to the second termination of the piston for engaging the ceiling. The arrangement is structured such that in use of the device, when the device is positioned between the door and the ceiling, the biasing device urges the door engaging fastener against the door and the ceiling pad against the ceiling so that the door is wedged and prevented from swinging or falling over so that painting of the door is permitted.

In a more specific embodiment of the present invention, the tubular member is of cylindrical configuration and is fabricated from metal.

Furthermore, the biasing device is a compression spring and the piston is a cylindrical tube which has an outside diameter and the tubular member has an inside diameter which is greater than the outside diameter of the cylindrical tube so that sliding of the piston within the tubular member is permitted.

Also, the door engaging fastener includes a cap which is secured to the first end of the tubular member and a plurality of spikes extend axially away from the cap and away from the first end of the tubular member.

The ceiling pad includes a block having a first and a second face, the first face being connected to the second termination of the piston. A resilient pad is secured to the second face of the block for contacting the ceiling and for preventing slippage of the device relative to the ceiling.

In one aspect of the present invention, a connector having a proximal and a distal end is arranged with the proximal end being secured to the second termination of the piston, the distal end defining a ball coupling. The first face of the block defines a socket for the swivelling reception therein of the ball coupling. The ceiling pad is arranged such that when the door engaging fastener is urged against the door, swivelling of the resilient pad and block is permitted so that engagement of a cathedral ceiling by the resilient pad is achieved.

The device also includes a handle which is connected to the tubular member. The handle includes a U-shaped member, the U-shaped member having a base. A first and a second arm extend from the base the first arm having a first and a second end. Also, the second arm has a first and a second termination. A hand grip has a first and a second extremity, the first extremity of the hand grip being secured to the second end of the first arm. The second extremity of the hand grip is secured to the second termination of the second arm.

A saddle has a first and a second end and the saddle cooperates with the base of the U-shaped member so that the tubular member is fixedly disposed between the saddle and the base.

Additionally, the first end of the saddle defines a head, the second end of the saddle defining a hole. The base of the U-shaped member defines a slot for the engagable reception therein of the head. The base also defines an aperture which is aligned with the hole. A threaded fastener extends through the hole and the aligned aperture so that when the threaded fastener is tightened, the tubular member is locked between the saddle and the base so that axial adjustment and fastening of the handle relative to the tubular member is permitted.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various embodiments of the drawings.

DETAILED DESCRIPTION OF THE DRAWINGS

Figure 1:
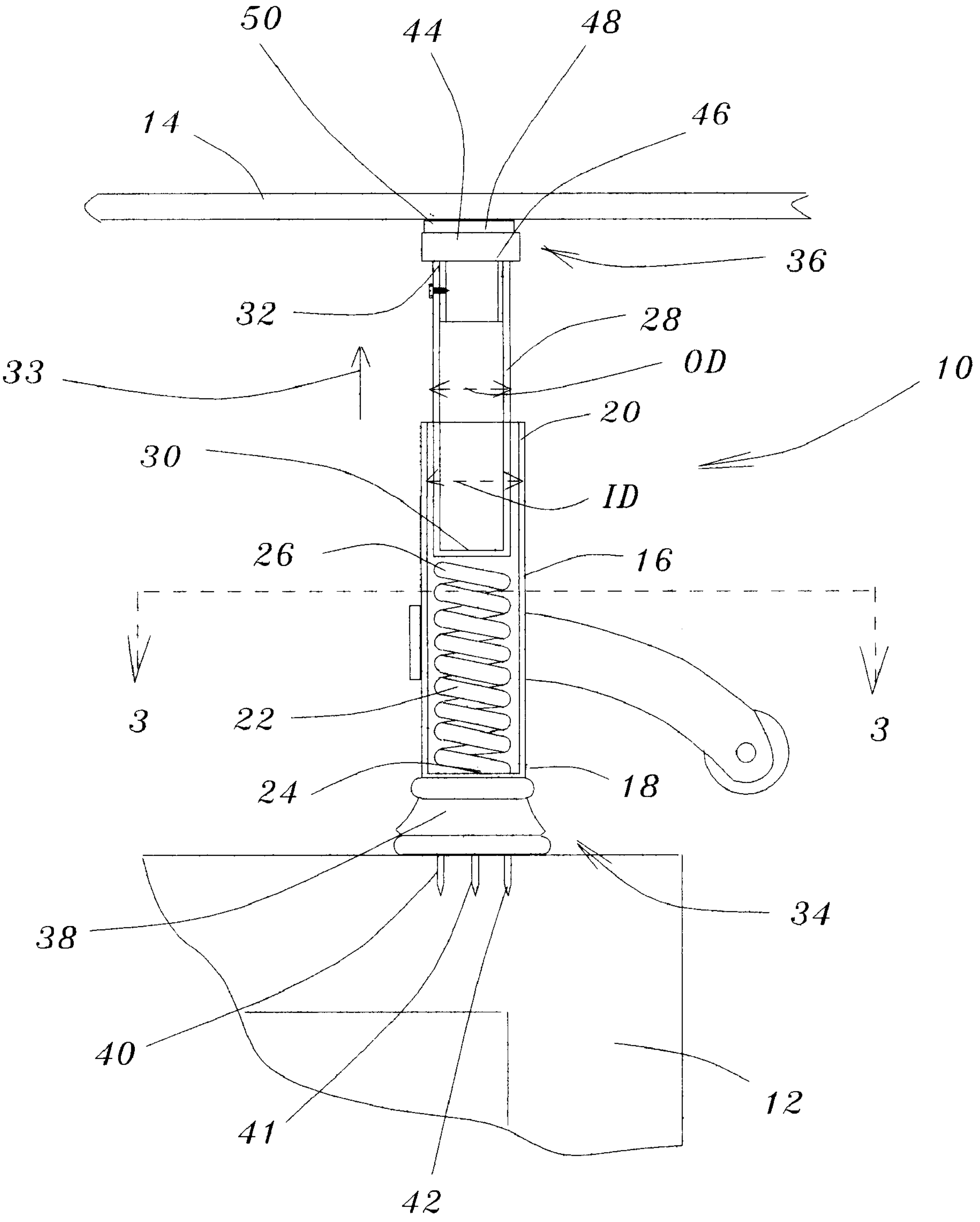
FIG. 1 is a side elevational view partially in section of a door holding device according to the present invention for wedging a door relative to a ceiling for preventing swinging or falling over of the door.

FIG. 1 is a side elevational view partially in section of a door holding device generally designated 10 according to the present invention, for wedging a door 12 relative to a ceiling 14 for preventing swinging or falling over of the door 12 during painting thereof.

As shown in FIG. 1, the door holding device 110 includes a tubular member 16 having a first and a second end 18 and 20 respectively. A biasing device 22 having a first and a second extremity 24 and 26 respectively is disposed within the tubular member 16 so that the first extremity 24 of the biasing device 22 abuts against the first end 18 of the tubular member 16. A piston 28 having a first and a second termination 30 and 32 is slidably disposed within the tubular member 16 so that the first termination 30 of the piston 28 abuts against the second extremity 26 of the biasing device 22 such that the piston 28 is urged by the biasing device 22 axially away from the first end 18 of the tubular member 16 as indicated by the arrow 33. A door engaging fastener generally designated 34 is rigidly secured to the first end 18 of the tubular member 16 such that in use of the device 10, the door engaging fastener 34 is disposed between the door 12 and the first end 18 of the tubular member 16. A ceiling pad generally designated 36 is connected to the second termination 32 of the piston 28 for engaging the ceiling 14. The arrangement is structured such that in use of the device 10, when the device 10 is positioned between the door 12 and the ceiling 14, the biasing device 22 urges the door engaging fastener 34 against the door 12 and the ceiling pad 36 against the ceiling 14 so that the door 12 is wedged and prevented from swinging or falling over so that painting of the door 12 is permitted.

In a more specific embodiment of the present invention, the tubular member 16 is of cylindrical configuration and is fabricated from metal.

Furthermore, the biasing device 22 is a compression spring and the piston 28 is a cylindrical tube which has an outside diameter OD and the tubular member 16 has an inside diameter ID which is greater than the outside diameter OD of the cylindrical tube 28 so that sliding of the piston 28 within the tubular member 16 is permitted.

Also, the door engaging fastener 34 includes a cap 38 which is secured to the first end 18 of the tubular member 16 and a plurality of spikes 40, 41 and 42 extend axially away from the cap 38 and away from the first end 18 of the tubular member 16.

The ceiling pad 36 includes a block 44 having a first and a second face 46 and 48 respectively, the first face 46 being connected to the second termination 32 of the piston 28. A resilient pad 50 is secured to the second face 48 of the block 44 for contacting the ceiling 14 and for preventing slippage of the device 10 relative to the ceiling 14.

Figure 2:
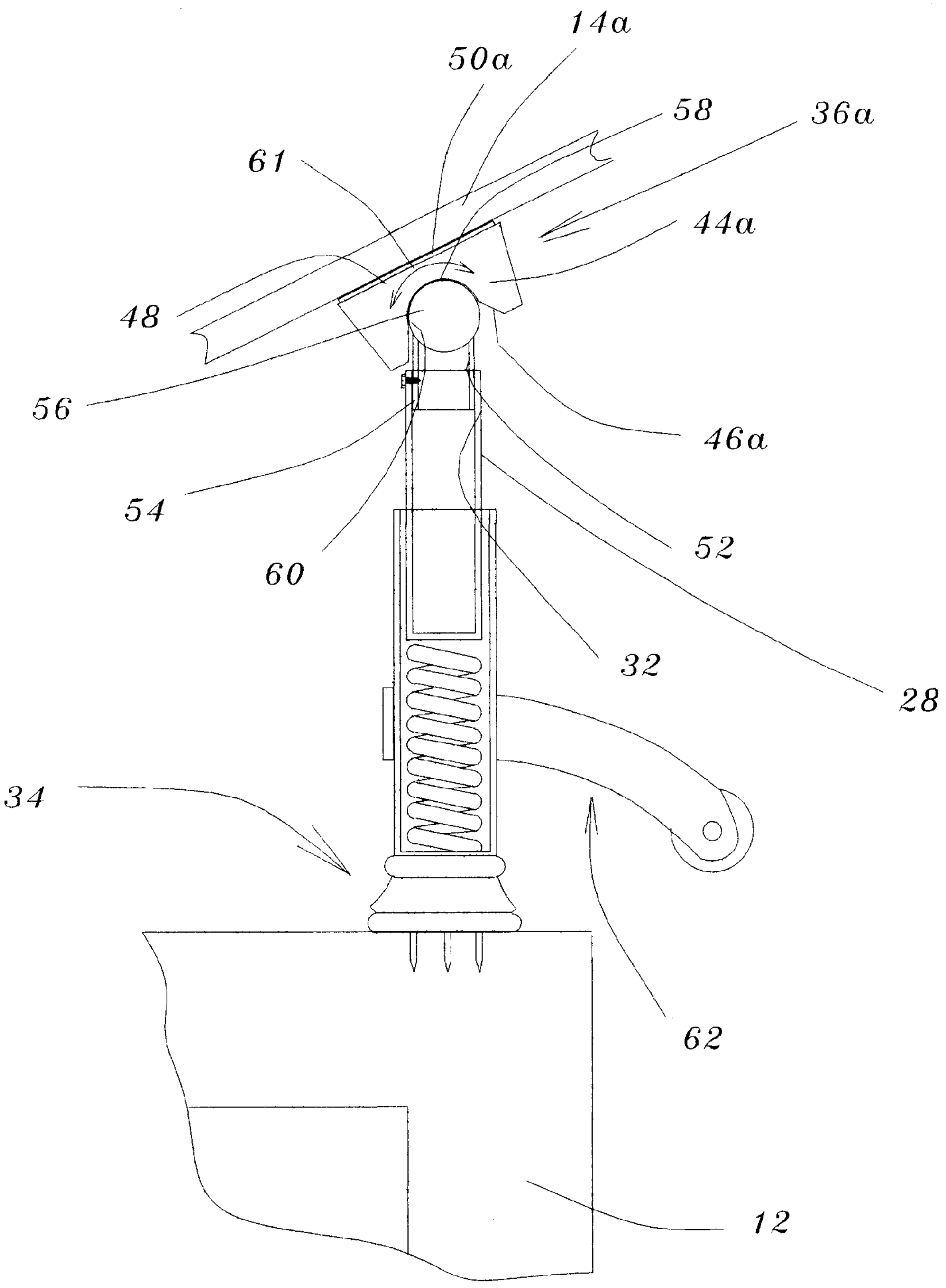
FIG. 2 is a similar view to that shown in FIG. 1 but shows a further embodiment of the present invention.

FIG. 2 is a similar view to that shown in FIG. 1 but shows another embodiment of the present invention. As shown in FIG. 2, a connector 52 has a proximal and a distal end 54 and 56 respectively arranged such that the proximal end 54 is secured to the second termination 32 of the piston 28, the distal end 56 defining a ball coupling 58. A first face 46*a* of a block 44*a* defines a socket 60 for the swivelling reception therein of the ball coupling 58. The ceiling pad 36*a* is arranged such that when the door engaging fastener 34 is urged against the door 12, swivelling of a resilient pad 50*a* and block 44*a* as indicated by the arrow 61 is permitted so that engagement of a cathedral ceiling 14*a* by the resilient pad 50*a* is achieved.

Figure 3:
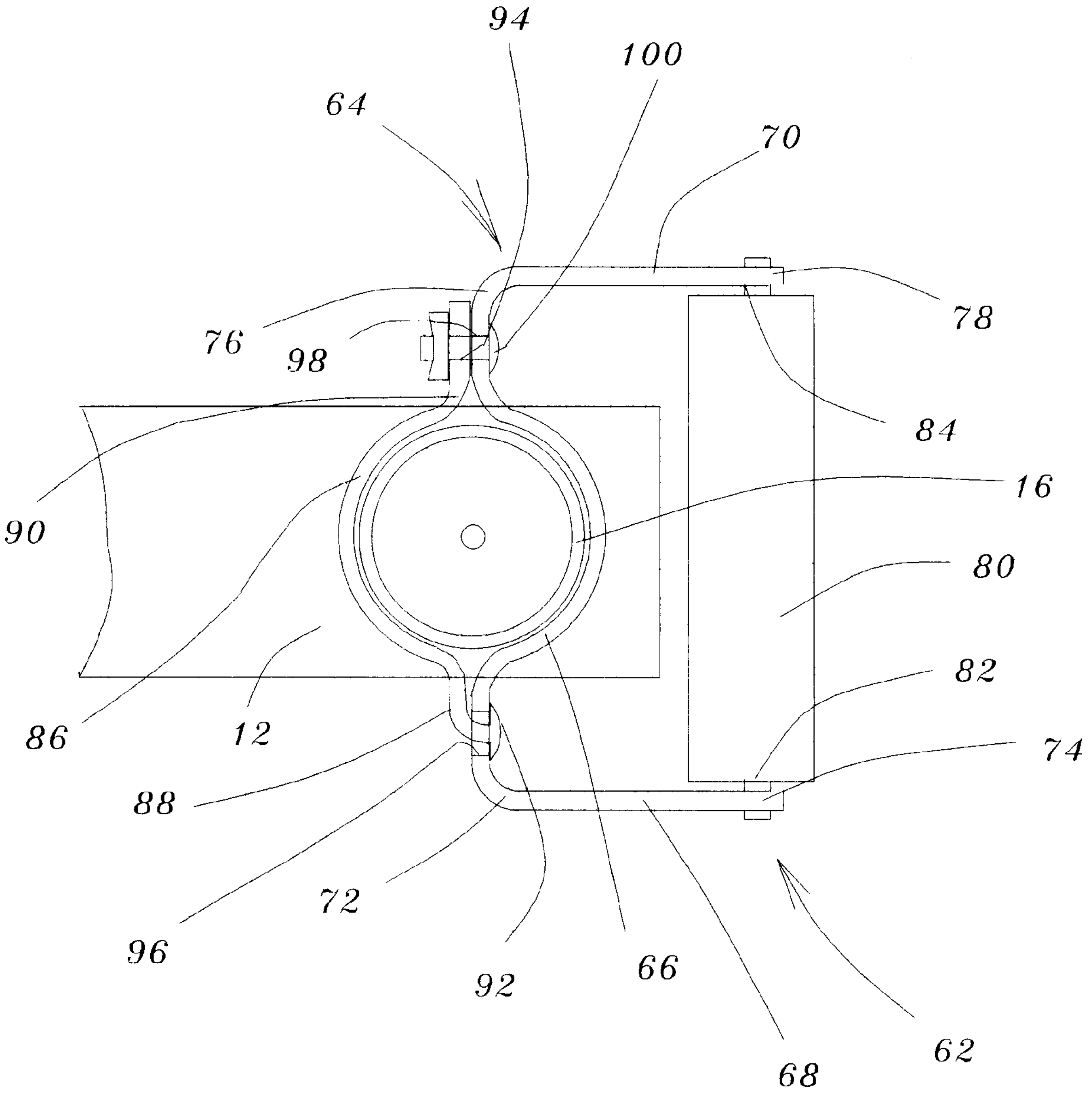
FIG. 3 is a sectional view taken on the line 3—3 of FIG. 1.

FIG. 3 is a sectional view taken on the line 3—3 of FIG. 1. As shown in FIG. 3, the device 10 also includes a handle generally designated 62 which is connected to the tubular member 16. The handle 62 includes a U-shaped member generally designated 64, the U-shaped member 64 having a base 66. A first and a second arm 68 and 70 respectively extend from the base 66, the first arm 68 having a first and a second end 72 and 74 respectively. Also, the second arm 70 has a first and a second termination 76 and 78 respectively. A hand grip 80 has a first and a second extremity 82 and 84 respectively, the first extremity 82 of the hand grip 80 being secured to the second end 74 of the first arm 68. The second extremity 84 of the hand grip 80 is secured to the second termination 78 of the second arm 70.

A saddle 86 has a first and a second end 88 and 90 respectively and the saddle 86 cooperates with the base 66 of the U-shaped member 64 so that the tubular member 16 is fixedly disposed between the saddle 86 and the base 66.

Additionally, the first end 88 of the saddle 86 defines a head 92, the second end 90 of the saddle 86 defining a hole 94. The base 66 of the U-shaped member 64 defines a slot 96 for the engagable reception therein of the head 92. The base 66 also defines an aperture 98 which is aligned with the hole 94. A threaded fastener 100 extends through the hole 94 and the aligned aperture 98 so that when the threaded fastener 100 is tightened, the tubular member 16 is locked between the saddle 86 and the base 66 so that axial adjustment and fastening of the handle 62 relative to the tubular member 16 is permitted.

In operation of the device according to the present invention, the user will grip the device 10 by the hand grip 80 and will push the resilient pad 50 against the ceiling 14 to compress the spring 22. The spikes 40–42 then engage the top of the door when pressure on the handle 80 is released so that the device 10 extends from the ceiling 14 to the top of the door 12 for wedging the same during painting of both sides of the door.

Although the device has been described with particular application to a door, those skilled in the art will appreciate that the device could equally be used for wedging a window or any other object to be painted.

Also, although the tubular member 16 is described as slidably receiving the piston 28, the door engaging fastener could be attached to the piston and the ceiling pad could be attached to the tubular member.

The present invention provides a unique device for preventing movement of a door during the painting thereof.

What is claimed is:

1. A door holding device for wedging a door relative to a ceiling for preventing swinging or falling over of the door during painting thereof, said device comprising:
   - a tubular member having a first and a second end;
   - a biasing device having a first and a second extremity, said biasing device being disposed within said tubular member so that said first extremity of said biasing device abuts against said first end of said tubular member;

a piston having a first and a second termination, said piston being slidably disposed within said tubular member so that said first termination of said piston abuts against said second extremity of said biasing device such that said piston is urged by said biasing device axially away from said first end of said tubular member;

a door engaging fastener rigidly secured to said first end of said tubular member such that in use of the device, said door engaging fastener is disposed between the door and said first end of said tubular member;

a ceiling pad connected to said second termination of said piston for engaging the ceiling, the arrangement being structured such that in use of said device, when said device is positioned between the door and the ceiling, said biasing device urges said door engaging fastener against the door and said ceiling pad against the ceiling so that the door is wedged and prevented from swinging or falling over so that painting of the door is permitted;

a handle connected to said tubular member;

said handle including:

a U-shaped member, said U-shaped member including:

a base;

a first and a second arm extending from said base said first arm having a first and a second end, said second arm having a first and a second termination;

a hand grip having a first and a second extremity, said first extremity of said hand grip being secured to said second end of said first arm, said second extremity of said hand grip being secured to said second termination of said second arm;

a saddle having a first and a second end, said saddle cooperating with said base of said U-shaped member so that said tubular member is fixedly disposed between said saddle and said base;

said first end of said saddle defining a head, said second end of said saddle defining a hole; said base of said U-shaped member defining a slot for the engagable reception therein of said head, said base also defining an aperture which is aligned with said hole; and a threaded fastener extending through said hole and said aligned aperture so that when said threaded fastener is tightened, said tubular member is locked between said saddle and said base so that axial adjustment and fastening of said handle relative to said tubular member is permitted.

2. A door holding device as set forth in claim 1 wherein said tubular member is of cylindrical configuration.

3. A door holding device as set forth in claim 2 wherein said piston is a cylindrical tube which has an outside diameter;

said tubular member having an inside diameter which is greater than said outside diameter of said cylindrical tube so that sliding of said piston within said tubular member is permitted.

4. A door holding device as set forth in claim 1 wherein said tubular member is fabricated from metal.

5. A door holding device as set forth in claim 1 wherein said a biasing device is a compression spring.

6. A door holding device as set forth in claim 1 wherein said door engaging fastener includes:

a cap which is secured to said first end of said tubular member;

plurality of spikes extending axially away from said cap and away from said first end of said tubular member.

7. A door holding device as set forth in claim 1 wherein said ceiling pad includes:

a block having a first and a second face, said first face being connected to said second termination of said piston;

a resilient pad secured to said second face of said block for contacting the ceiling and for preventing slippage of said device relative to the ceiling.

8. A door holding device as set forth in claim 7 further including:

a connector having a proximal and a distal end, said proximal end being secured to said second termination of said piston, said distal end defining a ball coupling;

said first face of said block defining a socket for the swivelling reception therein of said ball coupling, said ceiling pad being arranged such that when said door engaging fastener is urged against the door, swivelling of said resilient pad and block is permitted so that engagement of a cathedral ceiling by said resilient pad is achieved.

* * * * *